April 7, 1959     W. J. KUNZ, JR., ET AL     2,880,581
VOLTAGE CONTOURING DEVICE Original Filed Aug. 18, 1952     2 Sheets-Sheet 1

INVENTORS
WILLIAM J. KUNZ JR.
WARNER C. WINTRODE
Cecil J. Arens
ATTORNEY

April 7, 1959  W. J. KUNZ, JR., ET AL  2,880,581
VOLTAGE CONTOURING DEVICE
Original Filed Aug. 18, 1952  2 Sheets-Sheet 2

INVENTORS
WILLIAM J. KUNZ JR.
WARNER C. WINTRODE
Cecil J. Arens
ATTORNEY

United States Patent Office 2,880,581
Patented Apr. 7, 1959

2,880,581

VOLTAGE CONTOURING DEVICE

William J. Kunz, Jr., and Warner C. Wintrode, South Bend, Ind., assignors to Bendix Aviation Corporation, South Bend, Ind., a corporation of Delaware Continuation of application Serial No. 305,094, August 18, 1952. This application August 17, 1955, Serial No. 528,870

10 Claims. (Cl. 60—39.28)

This invention concerns electronic apparatus capable of producing an output signal with a desired wave shape. The present application is a continuation of application S.N. 305,094, filed August 18, 1952, now abandoned.

A primary purpose of the invention is to provide an electrical system capable of being incorporated into a servo control apparatus utilizing a reference signal for determining the position of the apparatus, or for performing an intended function.

It is an object of this invention to provide an electrical apparatus capable of supplying an output voltage whose level is a function of two variable conditions.

It is also an object of the invention to provide electrical apparatus which will modify a reference voltage as a function of two variable conditions.

A still further object of the invention resides in the provision of electronic control apparatus for use in conjunction with gas turbine engine fuel controls to regulate the fuel supplied to the engine during the acceleration period.

Another important object resides in the provision of novel electrical equipment capable of establishing a voltage with a wave form which is the equivalent of the output obtainable from a compound mechanical cam utilizing a suitable follower.

A yet further object is to provide novel means capable of modifying a direct voltage reference to be applied to the input of a servo amplifier, having its output connected to an electrically operated fuel valve located in the fuel system of a gas turbine engine, for controlling the fuel supplied during periods of acceleration, so as to circumvent the stall region.

The above and other objects and features of the invention will be apparent from the following description of the apparatus taken in connection with the accompanying drawings which form a part of this specification and in which.

Figure 1:
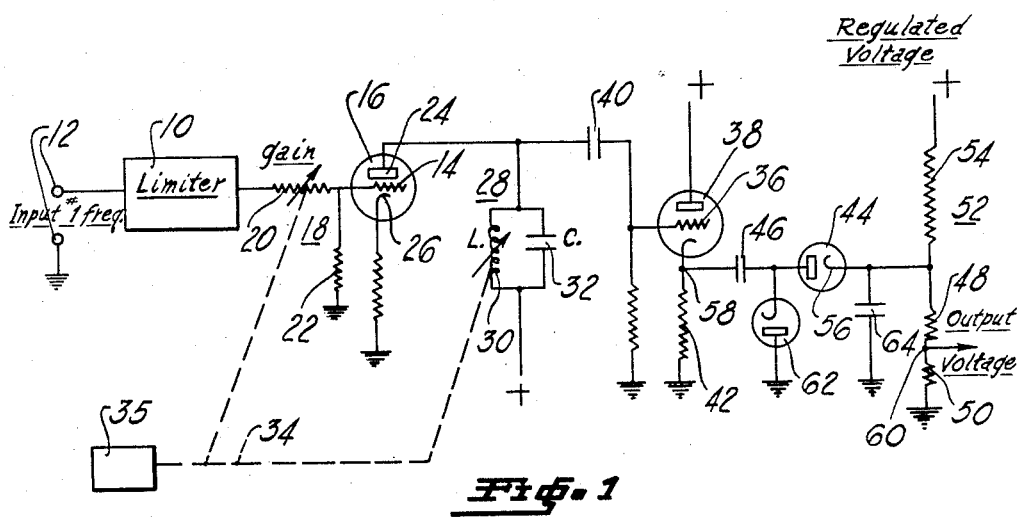
Figure 1 is a schematic representation showing the circuit of the voltage contouring apparatus which can be used to perform the electrical equivalent of a compound mechanical cam.

Referring now to the novel electrical apparatus of Figure 1, the reference numeral 10 designates a limiter circuit of conventional design, capable of limiting both amplitude extremities of the input wave applied to terminals 12. The input voltage applied to terminals 12 is alternating and is of a frequency which is directly proportional to a first variable condition, such for example as engine speed. This alternating voltage is fed into the limiter circuit so that the output from the limiter circuit provides a voltage of constant amplitude and a frequency proportional to the value of the condition to be sensed at any instant. The limiter circuit output voltage is connected to grid 14 of a thermionic tube 16, through a control network or voltage divider 18 made up of resistors 20 and 22. Tube 16 is provided with an anode 24 and cathode 26. In the anode circuit of the tube 16 is a contouring network 28, the latter of which embraces a parallel resonant circuit having an inductor 30 and capacitor 32. The network 28 provides a second input to the system, its resonant frequency of which is a function of a second variable condition. A linkage 34 is controlled by said second variable condition, such, for example, as inlet air temperature to an engine, and is operatively associated with a temperature condition-responsive device 35. The linkage 34 is connected to the variable resistor 20 of the control network 18 and to the variable inductor 30, of the filtering network 28, to vary the amplitude of the voltage impressed on the grid 14, and also the resonant frequency at which it is desired to have the maximum voltage appear on the plate, as a function of said second variable condition. The tube 16 is used as a linear amplifier and in addition provides isolation between the control and contouring networks 18 and 28, respectively. The magnitude of the voltage appearing at the plate 24 is dependent upon the gain of the tube 16, the adjustment made on the resistor 20, and the filtering characteristics of the parallel resonant circuit. The design values of the circuit elements 30 and 32 of the network 28 are determined by the frequency of the input signal to terminals 12, which signal reflects said first variable condition, at which it is desired to have the network 28 in resonance. The voltage established in the output circuit of the thermionic tube 16 is impressed on grid 36 of tube 38, which acts as a cathode follower. A coupling condenser 40 is interposed between the output of the tube 16 and the grid 36. The tube 38 provides isolation as well as a low impedance output source. A low impedance alternating voltage is developed across load resistor 42 and is converted to a direct voltage by diode tube 44. A blocking condenser 46 is connected between the cathode follower and the diode 44. The rectified voltage from the tube 44 is applied to resistors 48 and 50 of the output network 52, which also embraces resistor 54. A regulated reference voltage is connected across the resistors 48, 50 and 54, thus establishing a positive bucking voltage which is impressed on cathode 56 of the diode tube 44. With such an arrangement, no rectification will take place until the magnitude of the voltage at point 58 at the upper end of the resistor 42 is greater than the bucking voltage. Upon rectification, that is, when the tube 44 conducts, the current passing through the resistors 48 and 50 increases, thereby raising the potential of the regulated reference voltage at point 60. The return path of the rectified current is through diode tube 62. A smoothing condenser 64 is connected in the rectified output circuit.

It is evident that the level of the alternating voltage across resistor 42 is contoured by the networks 18 and 28, and that the reference voltage at point 60 is also suitably altered or modified. It will be noted that during rectification the potential of point 60 is elevated or increased.

Figure 5:
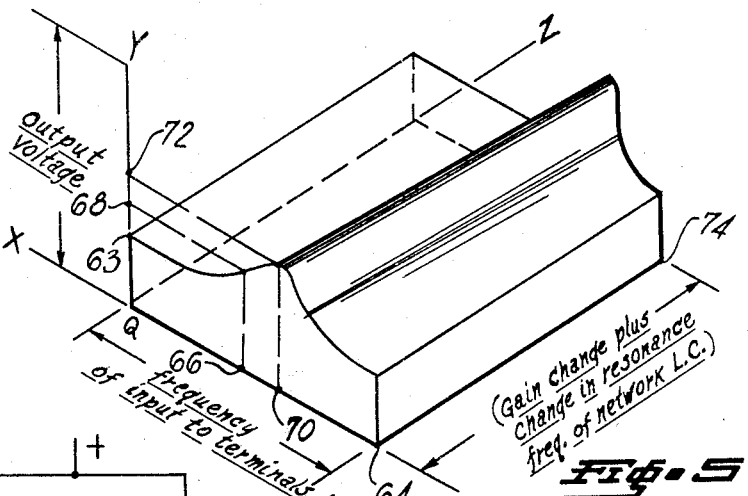
Figure 5 shows the output voltage available from the voltage contouring device of the invention and its similarity to a compound mechanical cam.

In order to illustrate the voltage contouring effect of the circuit of Figure 1, reference is made to Figure 5 which exemplifies what appears to be a compound cam having X, Y and Z axes. The Y axis represents the output voltage of the circuit of Figure 1, and is measured between point 60 and ground. The X axis represents the frequency of the input signal impressed on terminals 12. The frequency of this input signal reflects the first variable condition, such as the speed of an engine, as aforementioned. The curve as traced along the plane corresponding to the X—Y axis therefore shows the manner in which the voltage output varies with changes in the first variable condition. Changes introduced by variations in the second variable condition are depicted as projections of the X—Y curve along the Z axis, thus forming a pattern analogous to a surface in which the point of the maximum Y dimension (output voltage) varies both as to magnitude and position with changes in position along the Z axis. The position of the point of maximum voltage output and, to some extent, the shape of the curve at any given Z-axis value are determined by the resonant frequency of the tuned circuit 28. The magnitude of the greatest value of output voltage is determined by the gain as established by the variable resistor 20. The magnitude of the output voltage of this circuit, as shown at point 63 on the Y axis of Figure 5, represents the voltage which will appear across the resistor 50, that is, the voltage from point 60 to ground, Figure 1, with no rectification. This voltage at point 63 is the steady reference voltage with respect to the X and Z axes. At this time, that is, no rectification, the voltage across the resistor 42 is not yet equal to the bucking voltage applied to the cathode 56 of the tube 44. However, when the magnitude of the voltage across the resistor 42 is greater than the bucking voltage, the tube 44 conducts, which causes an increase in the current flow through resistors 48 and 50. This increase in voltage, in turn, causes an increase in the potential of the steady reference voltage. If, for example, the resonant circuit 28 were tuned to a frequency along the Z axis which was coincident with the X axis at 64, and if the frequency of the input signal applied to terminals 12 were of a value shown at 66 on the X axis, the output voltage will have increased to a height designated by point 68 on the Y axis. With the same frequency at point 64 along the Z axis, the frequency of the input signal to the terminals 12 must reach a point 70 on the X axis before attaining resonance in the network 28. At this time, the output voltage will have risen to the point 72 on the Y axis. If the network 28 were tuned to a frequency at point 74 on the Z axis, it is obvious that for the particular wave shape shown in Figure 5, resonant frequency will not be reached until some frequency greater than that represented at point 70 on the X axis were attained. Therefore, with the electrical apparatus of Figure 1, it is possible to vary the output as a function of two variable conditions. The basic voltage contouring device in Figure 1 is shown associated with the gas turbine engine in Figure 2 to provide a novel approach to the problem of controlling fuel to an engine in accordance with certain engine parameters. As a matter of fact, the circuitry of Figure 1 is utilized in the instant application to obviate a gas turbine engine condition known as surge or compressor stall. The application of Paul P. Stockinger, Serial No. 228,867, filed May 29, 1951, now Patent No. 2,689,455 (common assignee) is one form of servo amplifier for fuel control apparatus with which the novel invention may be used. It should be understood, however, that it is within the spirit of the invention to use the novel means herein disclosed with any type of electronic servo mechanism requiring a reference signal for performing its intended function.

Figure 2:
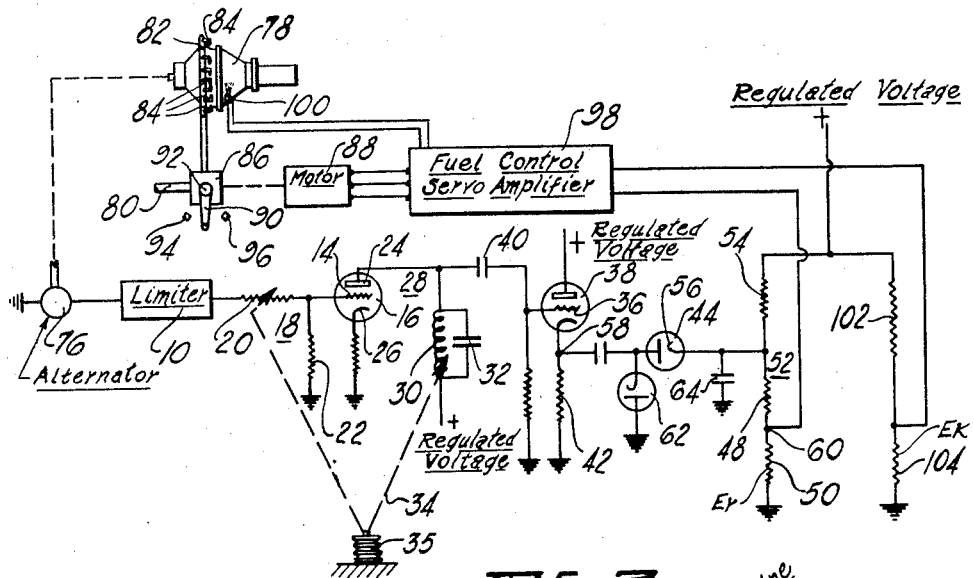
Figure 2 is a schematic showing the apparatus of the invention associated with a gas turbine engine.

Combining the circuitry of Figure 1 with the aforementioned servo mechanism requires no change in the basic elements of the circuit, but only the addition of other elements which will be hereinafter described, as shown in Figure 2. The input to the electrical apparatus is now provided by an alternator 76 drivably connected to a gas turbine engine 78. The output of the alternator is connected to the limiter 10 which senses the alternator frequency which is proportional to the speed of the engine.

A pipeline 80 supplies fuel to a manifold 82, equipped with a plurality of nozzles 84, each of which communicates with associated burners, not shown. A fuel valve 86 is located in the pipeline 80 between a source of fuel, not shown, and the manifold 82. The valve 86 is connected to a motor 88, which regulates the valve opening. At arm 90, which appends from a rotatable element 92 of the valve, engages the stops 94 and 96 when rotated to extreme positions in opposite directions from a central position, thus restricting valve opening and closing to predetermined limits. A fuel control servo amplifier 98 of the type described and claimed in application Serial No. 228,867, aforementioned, has its output connected to the motor 88 and its input connected to the output of the novel circuit hereinbefore discussed in detail in Figure 1. Since fuel flow to the engine is also a function of engine temperature, it is necessary to sense actual engine temperature. This is done by a thermocouple 100 located in the aft part of the engine 78 as indicated. The temperature sensed by this thermocouple is changed into a voltage signal which is fed into the servo amplifier 98. This thermocouple voltage signal is compared with a reference voltage in order to determine whether the fuel valve 86 is to be moved in a direction to increase or decrease the fuel to the engine. The output network 52, which comprises resistors 48, 50 and 54, is connected in parallel with the serially connected resistors 102 and 104 to provide a balanced bridge connected across a source of regulated voltage.

Figure 6:
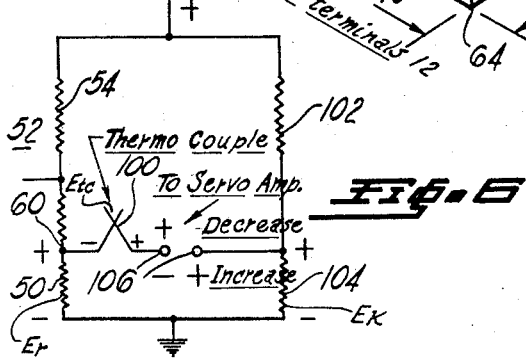
Figure 6 is a simplified form of the bridge wiring diagram of Figure 2.

The bridge network of Figure 2, which provides the input to the servo amplifier 98, is better illustrated in Figure 6 wherein the thermocouple 100 is shown as a voltage source to one leg of the bridge. The thermocouple voltage is connected additively to the voltage across the resistor 50, the latter voltage of which represents the voltage output from the contouring network. The voltage developed across the resistor 104 will be constant and reflect the desired engine temperature at which the engine is to be operated. This temperature is generally the maximum temperature at which the engine can be safely operated for optimum performance. A voltage equation for the bridge output of Figure 6 may be written as hereinafter shown wherein $E_r$ represents the contouring voltage across resistor 50, $E_{tc}$ represents the voltage of the thermocouple 100, and $E_k$ represents the voltage of the desired engine operating temperature which is to remain constant under a given set of conditions. These voltages represent the temperature loop of the fuel control system and are expressed mathematically in the following manner, $E_r + E_{tc} = E_k$. Therefore, if $E_r$ is increased, it follows that $E_{tc}$ must be decreased to satisfy the temperature loop equation. Obviously one way to reduce $E_{tc}$, the thermocouple voltage, is to decrease the actual engine temperature, and this can be done by cutting down on the engine fuel supply which is controlled by the fuel valve 86, through the servo amplifier 98. It can be concluded from what has been shown that any time the voltage $E_r$ increases an amount to unbalance the equation, the polarity across terminals 106 will be such as to cause the fuel valve 86 to move in a closing direction, thus causing a reduction in engine temperature. Whenever the voltage $E_k$ is greater than the sum of the voltages $E_r$ plus $E_{tc}$, the polarity across the terminals 106 is such as to cause the fuel valve 86 to move in an opening direction to thereby increase the fuel to the engine, thus causing an increase in engine temperature. References to Figures 4 and 5 will make it clear as to the relationship between the voltage and temperature curves. The wave shapes of these two curves is very much the same except that they are in effect 180° out of phase. However, this is as it should be because, as hereinbefore pointed out, an increase in the voltage $E_r$ will act in a direction to cause the fuel valve to move toward a closed position, thus reducing the engine temperature.

When this system is installed on an engine, the network 28 is first tuned to a predetermined frequency which corresponds to a desired engine speed $N_4$ at some selected engine inlet air temperature (standard day value, for example) and the network 18 is adjusted so that it establishes a voltage with a definite magnitude which represents the desired engine speed $N_4$ (Figure 4) at the aforesaid engine inlet air temperature. Thus for a particular value of inlet air temperature, a voltage with a controlled magnitude will occur at plate 24. This voltage will be maximum at the selected or desired engine speed $N_4$ and the given inlet air temperature for standard day value. These two networks 18 and 28 control the magnitude of the notch CF and its speed location $N_4$ along the abscissa.

A change in engine inlet air temperature from a given standard day value to a given cold day value, for example, causes the curve to shift to the left to C'F'. This change in inlet air temperature actuates the sensor device or bellows 35 which varies the resonant value of the network 28 so that it is now in resonance at a frequency corresponding to a speed $N_3$. The sensor device also selects another value of voltage for the network 18 which corresponds to the speed $N_3$, increasing the magnitude of the curve C'F' to the value shown. If the engine inlet air temperature changes to some particular hot day value, the resultant curve due to the new values set up in the networks 18 and 28 will be represented by C"F" at a speed $N_5$. It will be noted that the width of curve CF, that is the distance between points C and F, is a function of the Q of the coil 30 of the network 28.

Figure 3:
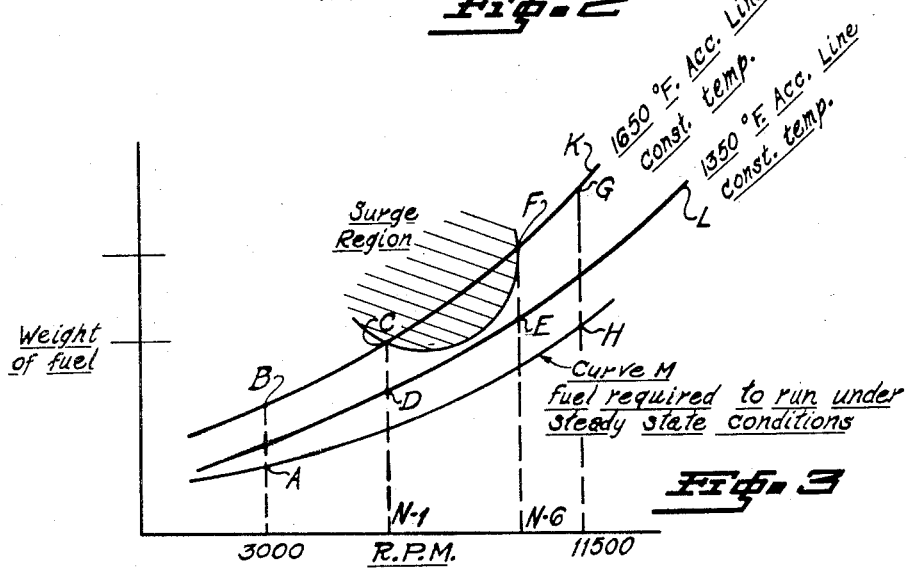
Figure 3 is a family of curves representing gas turbine engine characteristics.

Figure 3 shows the basic curves of a particular gas turbine engine with which the novel apparatus hereinbefore described is associated for modifying the fuel supplied during the engine acceleration period. An explanation of the problem involved and the method of determining the proper curve to circumvent the surge area are hereinafter described in connection with Figures 3 and 4.

With reference to Figure 3, curves K and L are constant temperature acceleration lines and are derived by plotting weight of fuel versus engine r.p.m. (under given conditions). This data is obtained from actual engine tests made for the purpose of determining the boundaries of the surge area to be circumvented. From tests made on the engine herein considered, it has been ascertained that a maximum engine acceleration temperature of 1650° F. is desirable. However, it should be noted that scheduling fuel along this curve runs afoul of the surge region, shown shaded. This, of course, must be avoided from the standpoint of optimum engine performance. Obviously, if the engine is caused to operate along the acceleration curve L, which represents a tailpipe temperature of 1350° F., the surge region will be avoided, that is, if the engine acceleration temperature is reduced to 1350° F. at point C on the curve K, the fuel required will be reduced to point D on the new acceleration curve L, which is outside the surge region. Unless a different acceleration temperature is selected, fuel will be scheduled along the curve L until the selected speed is reached, after which a steady state condition will be attained, along curve M. If, for example, the engine speed selected were 11,500 r.p.m., a vertical line passing through this value on the abscissa will intersect the steady state curve M at point H, thus determining the fuel required for steady state operation.

However, instead of scheduling fuel along the 1350° F. constant temperature acceleration curve, as might have been done, after passing out from under the surge region, it is more desirable to schedule fuel at the higher acceleration temperature, to wit, 1650° F. Therefore, since point E on the curve L is out from under the surge region, scheduling at the higher temperature is resumed at this point. Fuel is now supplied to the engine in accordance with the requirements of the 1650° F. constant temperature curve between points F and G. If an engine speed of 11,500 r.p.m. were selected, the weight of fuel supplied to the engine will drop from point G on the curve K to point H on the curve M when a steady state condition is reached.

Figure 4:
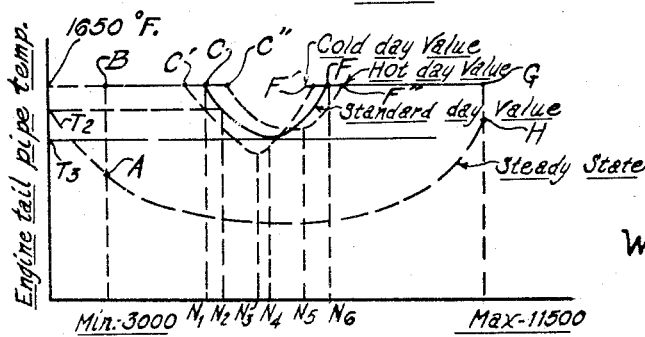
Figure 4 shows a typical engine burner or tailpipe temperature versus engine r.p.m. curve to which a reference voltage may be tailored to circumvent the stall region.

With the information available from Figure 3, the curves of Figure 4 are plotted, with engine temperature as the ordinate and engine r.p.m. as the abscissa. The curves of Figure 4 form a basis for the construction of circuitry (as shown in Figure 1) which will create a signal with a wave form that avoids the surge area of Figure 3. That is, because of the relationship between engine temperature and r.p.m. in connection with surge, curves such as those of Figure 4 can be used as a foundation for the construction of an electrical system which will produce an output signal which conforms to that curve, within practical operating limits, to be fed into the servo amplifier 98. The data used for plotting the curves is obtained by empirical methods and is used in constructing a fuel mechanism that will meet the engine requirements. In the instant case, it has been determined that 1650° F. is the maximum constant tailpipe acceleration temperature allowable and this temperature must be reduced (under some particular engine inlet air temperature) when engine r.p.m. reaches a value of $N_1$, point C on the maximum temperature curve K. This point may be determined in test by holding the temperature of the engine at some maximum operating temperature, say 1650° F., and supplying fuel to the engine to maintain that temperature as engine speed is increased, observing the speed at which surge starts, then cutting back the fuel supply accordingly, to thereby move along the dip represented by the solid line between points G and F, Figure 4. Other engine operating temperatures and speeds such as $T_2$ and $N_2$, respectively, may be selected on the fringe area of the surge region by the same procedure used for establishing point C. This method of picking points on the fringe area of the surge region is followed around to point F on the maximum tailpipe temperature curve representing 1650° F., where scheduling of fuel is continued at the maximum tailpipe temperature. If maximum engine speed were set at 11,500 r.p.m. fuel is added in increasing quantities until point G on the 1650° F. curve is reached, at which time the fuel required to maintain this selected speed is reduced to that shown at point H. It should be borne in mind that points C and F represent engine speeds of $N_1$ and $N_6$ and a tailpipe temperature of 1650° F. at a given engine inlet air temperature. A change in inlet air temperature will shift points CF, to C'F', or C"F", depending on whether the engine inlet air temperature has decreased or increased respectively. The inlet air temperature sensor 35 controls the resonant filtering characteristics of the contouring network 28 causing points CF to be shifted along the 1650° F. constant temperature acceleration curve, as shown, and also changes the value of network 20, and hence the magnitude of the dip in the curve CF.

Operation of the apparatus is as follows: Assume that the engine is operating at A on the steady state curve M (Figure 3) at a speed of 3,000 r.p.m. when a decision is made to accelerate the engine to 11,500 r.p.m. The selection of an engine speed, of 11,500 r.p.m. causes the apparatus of the invention to be connected to the external utilization circuit or servo amplifier 98 through means not immediately related to the present invention. Since the newly selected acceleration temperature calls for more fuel at the same r.p.m., the valve 86 opens immediately so as to increase the fuel to point B on the 1650° F. curve (see Figure 3). This curve is traversed from B to C with an increase in engine speed from a minimum of 3,000 r.p.m. to $N_1$. It will be observed that any increase in fuel beyond C and along curve K will create a surge condition which must be avoided. This shaded region, surge area, can be by-passed by modifying the reference signal which is represented by the horizontal line BC FG (Figure 4) on each side of the surge area. The modified portion of the reference signal being represented by the curved line CF. Alteration of the reference signal is brought about by the fact that during the period that the engine speed is going from a minimum of 3,000 r.p.m. to $N_1$, the plate voltage of the tube 16 has been a minimum, and, as a result, the magnitude of the potential at 58 is insufficient to overcome the bucking voltage on the cathode of the tube 44. As the engine speed increases beyond $N_1$ and up to $N_4$, the input to the filtering network 28 approaches resonance which means that the plate voltage of the tube 16 becomes greater in magnitude, and the voltage at 58 becomes greater than the bucking voltage, thus effecting conduction of the diode tube 44. This changes the level of the reference voltage at 60, which change is transferred to the servo amplifier. When engine speed has reached $N_4$, the filtering network is in resonance with the frequency produced by the engine alternator. At this time, the reference voltage is being modified a maximum amount. That is, the potential at 60 is greatest. This potential is represented by the point 72 on the voltage axis Y of Figure 5. As the speed increases from $N_4$ to $N_6$, the network 28 becomes less resonant, thus reducing the magnitude of the change in the reference voltage until $N_6$ is reached, at which time the tube 44 no longer conducts so that the level of the voltage at 60 becomes normal again. Acceleration beyond F is along curve K until G is reached, the point of maximum engine speed. The amount of fuel required for continued engine operation at maximum speed is reduced to H on the steady state curve by automatic means not included in this invention.

Any changes in engine inlet air temperature are determined by the sensor 35 which varies the resistance 20 and the variable inductance 30. Changing the value of the inductance establishes a new resonance frequency for the network 28, causing the curve CF to be shifted to C′F′ or C″F″, depending on whether the inlet air temperature increased or decreased from a standard day value. This action, in combination with the change in resistance value 20, results in a change of the temperature depression curves, both in magnitude and location.

Although this invention has been described in connection with certain specific embodiments, the principles are susceptible to numerous other applications that will readily occur to persons skilled in the art.

Having thus described the various features of the invention, what we claim as new and desire to secure by Letters Patent is:

We claim:
1. An electrical apparatus having its output connected to a reference voltage to be modified comprising a voltage dividing network, means for applying a voltage with a constant amplitude and a frequency proportional to different predetermined values of a first variable condition to said network, means for varying the magnitude of the output voltage of said voltage dividing network as a function of a second variable condition, a parallel resonant circuit connected to said last-named means and having a resonant frequency which is variable by said last named means as a function of said second variable condition, an amplifier connected to said voltage dividing network and said parallel resonant circuit such that the output of said amplifier is varied by said resonant circuit, and means connecting the amplifier output to said reference voltage whereby said reference voltage is modified with changes in said first and second variable conditions.

2. An electrical apparatus having its output connected to a reference voltage to be modified comprising a voltage dividing network, means for applying a voltage with a constant amplitude and a frequency proportional to various values of a first variable condition to said network, means for varying the output of said voltage dividing network as a function of a second variable condition, a parallel resonant circuit having a resonant frequency which is variable by said second named means as a function of said second variable condition, an electrical amplification device having input and output circuits connected to said voltage dividing network and said parallel resonant circuit respectively, and means connecting the output signal to said reference voltage whereby said reference voltage is modified with changes in said first and second variable conditions.

3. An electrical apparatus having its output connected to a reference voltage to be modified comprising a voltage dividing network, means for developing a voltage with a constant amplitude and a frequency proportional to various values of a first variable condition to be applied to said network, a frequency sensitive network having a predetermined resonance characteristic corresponding to a selected value of said variable condition, means controlled by a second variable condition connected to said networks for varying both the output of said voltage dividing network and the resonance characteristic of said frequency sensitive network as a function of said second variable condition, an amplifier connected to said voltage dividing and frequency sensitive networks such that the output of said amplifier is varied with changes in said first and second variable conditions, and means connecting the output of said amplifier to said reference voltage.

4. An electrical apparatus having its output connected to a reference voltage to be modified comprising a control network, means for applying a voltage with a frequency proportional to various values of a first variable condition to said network, means for varying the output of said network as a function of a second variable condition, an electrical amplification device having input and output circuits, the output of said network being connected into the input circuit of said device, a filtering network in the output circuit of said device including a parallel resonant circuit and means controlled as a function of said second variable condition for varying the resonant frequency of said circuit, and means connecting the output signal of said device to said reference voltage whereby said reference voltage is modified with changes in said first and second variable conditions.

5. An electrical apparatus having its output connected to a reference voltage to be modified comprising a control network, means for applying a voltage with a frequency proportional to various values of a first variable condition to said network, means for varying the output of said network as a function of a second variable condition, an electrical amplification device having input and output circuits, the output from said network being connected into the input circuit of said device, a frequency sensitive network in the output circuit of said device including a variable impedance device operatively connected to said second named means and controlled as a function of said second variable condition, and means connecting the output signal of said device to the reference voltage including a diode and a voltage divider network whereby said reference voltage is modified with changes in said first and second variable conditions.

6. In a control system for a gas turbine engine having a valve and electrical control means for a valve including a servo amplifier and a bridge network connected to said amplifier, said network having a reference voltage impressed thereon: apparatus for modifying said reference voltage as a function of engine speed and inlet air temperature, said apparatus comprising an electrical amplification device having input and output circuits, a control network in the input circuit, a frequency sensitive network in the output circuit, means for applying a voltage with a frequency proportional to engine speed to the control network, and means for varying the output of said control network as a function of engine inlet air temperature, said last named means also including a mechanism capable of changing the resonance characteristics of said frequency sensitive network.

7. An electrical apparatus having its output connected to a reference voltage to be modified comprising a voltage divider network, means for applying a voltage with a constant amplitude and a frequency which varies as a function of a first variable condition to said network, means for varying the amplitude of the output voltage of said network as a function of a second variable condition, a filtering network having a predetermined filtering characteristic corresponding to a given condition of said first variable condition, means for changing said predetermined filtering characteristic as a function of said second variable condition, a thermionic device having input and output circuits connected to said voltage divider network and said filtering network respectively, means connecting the output circuit of said device to the reference voltage, said last-named means including a voltage divider system on which said reference voltage is impressed, and a diode tube having its cathode connected to said system and its anode connected to said output circuit of the device in such a manner that rectification takes place only when the magnitude of the voltage on the anode becomes greater than the magnitude of the voltage applied to the cathode.

8. An electrical apparatus comprising a voltage divider circuit having a predetermined reference voltage applied thereto, a control network, means including a speed sensing device and a limiter circuit for applying a voltage with a constant amplitude and a frequency proportional to the speed sensed by said device to the input of said network, a parallel resonant circuit tuned to a frequency corresponding to a predetermined speed sensed by said device, means controlled as a function of a variable condition for varying the magnitude of the output voltage of said network and for tuning the parallel resonant circuit to respond to a different frequency, and means connecting the network and parallel resonant circuit to the voltage divider circuit whereby said reference voltage is modified with changes in speed and said variable condition.

9. In an engine control system including a valve and electrical servo means controlling said valve: means producing an electrical control signal comprising a mechanism for establishing a signal with a constant magnitude and a frequency proportional to various values of a first variable condition of the engine, a voltage dividing network connected to said mechanism to receive said signal, a frequency sensitive network capable of establishing a condition of resonance therein when the signal frequency is at a predetermined value, a mechanism connected to the voltage dividing and frequency sensitive networks for varying the output of the voltage dividing network and the resonance of the frequency sensitive network as a function of a second variable condition of the engine, an electrical amplification device having input and output circuits connected to said voltage dividing and frequency sensitive networks respectively; a resistance bridge network connected to said servo means having a branch across which a reference voltage representative of a desired value of a third engine operating condition is developed, means producing a signal varying with instantaneous values of said third engine operating condition, means connecting said last named signal to said bridge in opposition to said reference voltage for comparison therewith, and means connecting the output of said electrical amplification device to said bridge network such that the balance point of said network is varied with changes in said first and second variable conditions of said engine.

10. In an engine control system including a valve and electrical servo means controlling said valve: means producing a temperature control signal comprising a mechanism for establishing a signal with a constant magnitude and a frequency proportional to the speed of the engine, a voltage dividing network connected to said mechanism to receive said signal, a frequency sensitive network capable of establishing a condition of resonance therein when the signal frequency is at a predetermined value, a temperature responsive mechanism connected to the voltage dividing and frequency sensitive networks for varying the output of the voltage dividing network and a resonance of the frequency sensitive network as a function of engine air inlet temperature, an electrical amplification device having input and output circuits connected to said voltage dividing and frequency sensitive network respectively; a resistance bridge network connected to said servo means having a branch across which a temperature reference signal is developed, means producing a signal varying with instantaneous values of engine tailpipe temperature, means connecting said tailpipe temperature signal to said bridge in opposition to said reference signal for comparison therewith, and means connecting the output of said electrical amplification device to said bridge network such that the balance point of said network is varied with changes in engine speed and air inlet temperature.

References Cited in the file of this patent
UNITED STATES PATENTS

| 2,431,501 | Phillips | Nov. 25, 1947 |
| 2,623,354 | Best | Dec. 30, 1952 |
| 2,720,751 | Kunz | Oct. 18, 1955 |